UNITED STATES PATENT OFFICE.

CECIL O. PHILLIPS, OF NEW YORK, N. Y.

TREATMENT OF COTTON-SEED MEATS.

1,347,870. Specification of Letters Patent. Patented July 27, 1920.

No Drawing. Application filed August 3, 1918. Serial No. 248,146.

*To all whom it may concern:*

Be it known that I, CECIL O. PHILLIPS, a citizen of the United States, residing at New York city, in the county of New York, State of New York, have invented certain new and useful Improvements in the Treatment of Cotton-Seed Meats, (Case D;) and I do hereby declare the following to be a full, clear, and exact description of the invention, such as will enable others skilled in the art to which it appertains to make and use the same.

This invention relates to improvements in the extraction of oil from cottonseed meats.

In my prior Patent No. 705,785, dated July 29, 1902, I have described a process of producing cottonseed oil from cottonseed meats according to which the cottonseed meats are treated with an alkali, such as a solution of caustic soda, before they are subjected to the cooking operation, the alkali acting upon the free fatty acids in the oil to combine therewith and thereby neutralize them.

The amount of free fatty acids contained in the higher grades of cottonseed oil expressed from the meats is usually one per cent. or more and averages around one and one-half or two percent., while for inferior grades of oil the percentage of free fatty acids may be as high as five percent., or even higher. In order that such free fatty acids may be neutralized by the caustic alkali, in the process of the patent above referred to, it is accordingly necessary that a corresponding amount of the alkali be added, and provision is accordingly made, in the process of said patent, for such addition.

The present invention is based upon the discovery that improved results can be obtained with a very materially decreased amount of caustic alkali, the amount being but a small fraction of the amount required for neutralization of the free fatty acids, and the action of the caustic alkali being due, as I believe, to a selective action upon the albuminous and other constituents of the meats, during the cooking operation, rather than to neutralization of the free fatty acids, inasmuch as most of the free fatty acids remain unneutralized at the end of the treatment, while the extraction of the oil is nevertheless improved.

In carrying out the process of the present invention, I proceed, for example, as follows:

A dilute solution of caustic alkali is prepared containing about three-quarters of an ounce of caustic soda per gallon, and about three gallons of this solution is distributed with substantial uniformity throughout the meats prior to the cooking operation, the amount of solution referred to being intimately combined with about thirteen hundred pounds of the decorticated meats (said meats being freed from the major portion of the hulls and retaining only about twenty per cent. of hull constituents).

The seed may be decorticated in the usual manner and the major portion of the hull separated therefrom; and the dilute alkali solution may be applied to the meats by sprinkling or otherwise, so that it will be uniformly distributed throughout the meats. After the uniform combination of the alkali with the meats, they are subjected to the usual cooking operation which may be carried out in the customary manner.

Inasmuch as the dilute caustic solution is sufficient in amount to neutralize but a small percentage of the total fatty acids present, and inasmuch as the dilute alkali is intimately mixed with the meats while the oil is still retained thereby, I am led to believe that the action of the caustic alkali is a selective action upon the albuminous or mucilaginous constituents of the seed, inasmuch as it is with such constituents that the dilute solution is first brought into direct contact, while direct contact with the oil is thereby largely prevented. The beneficial result as regards the increase in oil obtained further indicates that the alkali has a selective action upon the enveloping constituents which hold the oil so that the oil is set free to a greater extent, or permitted to be subsequently expelled in larger amount, than where the caustic alkali is not employed.

I claim:

1. The method of improving the extraction of oil from cottonseed meats which comprises intimately incorporating with the meats a small amount of a dilute caustic soda solution, the amount of the solution being insufficient to effect neutralization of more than a small fraction of the total fatty acids present, subjecting the resulting meats to a cooking operation, and expressing the oil from the cooked meats; substantially as described.

2. The method of improving the extraction of oil from cottonseed meats which comprises intimately incorporating with about thirteen hundred pounds of the meats about three gallons of a dilute caustic soda solution containing about three-quarters of an ounce of caustic soda per gallon, subjecting the resulting meats to a cooking operation and expressing the oil from the cooked meats; substantially as described.

In testimony whereof I affix my signature.

CECIL O. PHILLIPS.